(12) United States Patent
Torres et al.

(10) Patent No.: US 11,188,822 B2
(45) Date of Patent: Nov. 30, 2021

(54) ATTENDEE ENGAGEMENT DETERMINING SYSTEM AND METHOD

(71) Applicant: ON24, Inc., San Francisco, CA (US)

(72) Inventors: Erika Torres, San Francisco, CA (US); Jayesh Sahasi, San Francisco, CA (US)

(73) Assignee: ON24, INC., San Francisco, CA (US)

( * ) Notice: Subject to any disclaimer, the term of this patent is extended or adjusted under 35 U.S.C. 154(b) by 933 days.

(21) Appl. No.: 15/726,018

(22) Filed: Oct. 5, 2017

(65) Prior Publication Data
US 2019/0108438 A1 Apr. 11, 2019

(51) Int. Cl.
*G06N 3/08* (2006.01)
*G06N 5/00* (2006.01)
*H04L 29/08* (2006.01)

(52) U.S. Cl.
CPC .............. *G06N 3/08* (2013.01); *G06N 5/003* (2013.01); *H04L 67/306* (2013.01); *H04L 67/36* (2013.01)

(58) Field of Classification Search
CPC .......... G06N 20/20; G06N 5/00; G06N 5/003; G06N 3/04; G06N 3/08; G06N 3/0427; G06N 99/00; G06Q 50/00; G06Q 50/01; G06Q 10/00; G06Q 30/00; G06Q 30/02; G06Q 30/0201; H04L 67/10; H04L 67/67; H04L 67/306; H04L 29/08; G06F 17/30
See application file for complete search history.

(56) References Cited

U.S. PATENT DOCUMENTS

| | | | |
|---|---|---|---|
| 5,220,665 A | 6/1993 | Coyle, Jr. | |
| 5,388,197 A | 2/1995 | Rayner | |
| 5,420,801 A | 5/1995 | Dockter et al. | |
| 5,557,796 A | 9/1996 | Fehskens et al. | |
| 5,642,171 A | 6/1997 | Baumgartner et al. | |
| 5,680,619 A | 10/1997 | Gudmundson et al. | |
| 5,732,216 A | 3/1998 | Logan et al. | |
| 5,748,185 A | 5/1998 | Stephan et al. | |
| 5,752,244 A | 5/1998 | Rose et al. | |

(Continued)

FOREIGN PATENT DOCUMENTS

| | | |
|---|---|---|
| CN | 1500353 A | 5/2004 |
| CN | 103535026 A | 1/2014 |

(Continued)

OTHER PUBLICATIONS

Aguiar, Everaldo, et al. "Engagement vs performance: using electronic portfolios to predict first semester engineering student retention." Proceedings of the Fourth International Conference on Learning Analytics and Knowledge. 2014: 103-112 (Year: 2014).*

(Continued)

Primary Examiner — Kamran Afshar
Assistant Examiner — Randall K. Baldwin
(74) Attorney, Agent, or Firm — DLA Piper LLP (US)

(57) ABSTRACT

A system and method determines engagement for a future presentation for one or more future attendees/registrants for the future presentation. The system and method may extract features from the registrant data for each registrant of the future presentation, generate a model based on the extracted features and use a classification process to generate the engagement determination for each attendee/registrant of the future presentation.

19 Claims, 6 Drawing Sheets

(56) References Cited

U.S. PATENT DOCUMENTS

| | | |
|---|---|---|
| 5,801,685 A | 9/1998 | Miller et al. |
| 5,815,154 A | 9/1998 | Hirschtick et al. |
| 5,838,973 A | 11/1998 | Carpenter-Smith et al. |
| 5,861,906 A | 1/1999 | Dunn |
| 5,892,915 A | 4/1999 | Duso et al. |
| 5,929,850 A | 7/1999 | Broadwin |
| 5,996,015 A | 11/1999 | Day |
| 6,006,332 A | 12/1999 | Rabne et al. |
| 6,008,807 A | 12/1999 | Bretschneider et al. |
| 6,009,458 A | 12/1999 | Hawkins et al. |
| 6,014,706 A | 1/2000 | Cannon |
| 6,058,424 A | 5/2000 | Dixon |
| 6,097,441 A | 8/2000 | Allport |
| 6,108,645 A | 8/2000 | Eichstaedt et al. |
| 6,141,595 A | 10/2000 | Gloudeman et al. |
| 6,155,840 A | 12/2000 | Sallette |
| 6,157,809 A | 12/2000 | Kaqmbayashi |
| 6,223,292 B1 | 4/2001 | Dean et al. |
| 6,253,368 B1 | 6/2001 | Nelin et al. |
| 6,324,683 B1 | 11/2001 | Fuh et al. |
| 6,366,916 B1 | 4/2002 | Baer et al. |
| 6,396,500 B1 | 5/2002 | Qureshi et al. |
| 6,404,978 B1 | 6/2002 | Abe |
| 6,445,834 B1 | 9/2002 | Rising, III et al. |
| 6,452,609 B1 | 9/2002 | Katinsky et al. |
| 6,473,749 B1 | 10/2002 | Smith et al. |
| 6,523,022 B1 | 2/2003 | Hobbs |
| 6,535,909 B1 | 3/2003 | Rust |
| 6,538,665 B2 | 3/2003 | Crow et al. |
| 6,546,405 B2 | 4/2003 | Gupta et al. |
| 6,601,026 B2 | 7/2003 | Appelt et al. |
| 6,628,279 B1 | 9/2003 | Schell et al. |
| 6,629,065 B1 | 9/2003 | Gadh et al. |
| 6,636,237 B1 | 10/2003 | Murray et al. |
| 6,636,888 B1 | 10/2003 | Bookspan et al. |
| 6,657,543 B1 | 12/2003 | Chung |
| 6,697,805 B1 | 2/2004 | Choquier et al. |
| 6,714,909 B1 | 3/2004 | Gibbon et al. |
| 6,715,126 B1 | 3/2004 | Chang et al. |
| 6,728,753 B1 | 4/2004 | Parasnis et al. |
| 6,745,344 B1 | 6/2004 | Joshi et al. |
| 6,748,382 B1 | 6/2004 | Mohan et al. |
| 6,795,972 B2 | 9/2004 | Rovira |
| 6,801,224 B1 | 10/2004 | Chang et al. |
| 6,834,308 B1 | 12/2004 | Ikezoye et al. |
| 6,842,175 B1 | 1/2005 | Schmalstieg et al. |
| 6,850,944 B1 | 2/2005 | MacCall et al. |
| 6,859,838 B1 | 2/2005 | Puranik et al. |
| 6,877,023 B1 | 4/2005 | Maffeis et al. |
| 6,920,181 B1 | 7/2005 | Porter |
| 7,062,722 B1 | 6/2006 | Carlin et al. |
| 7,079,990 B2 | 7/2006 | Haller et al. |
| 7,096,416 B1 | 8/2006 | Smith et al. |
| 7,103,770 B2 | 9/2006 | Conrath |
| 7,146,329 B2 | 12/2006 | Conkwright et al. |
| 7,168,035 B1 | 1/2007 | Bell et al. |
| 7,188,186 B1 | 3/2007 | Meyer et al. |
| 7,281,034 B1 | 10/2007 | Eyal |
| 7,281,060 B2 | 10/2007 | Hofmann et al. |
| 7,290,057 B2 | 10/2007 | Suanders et al. |
| 7,296,137 B2 | 11/2007 | Moyer |
| 7,313,595 B2 | 12/2007 | Rust |
| 7,330,875 B1 | 2/2008 | Parasnis et al. |
| 7,349,944 B2 | 3/2008 | Vernon |
| 7,350,231 B2 | 3/2008 | Madison et al. |
| 7,363,372 B2 | 4/2008 | Potenzone et al. |
| 7,370,269 B1 | 5/2008 | Prabhu et al. |
| 7,415,529 B2 | 8/2008 | Saunders et al. |
| 7,418,431 B1 | 8/2008 | Nies et al. |
| 7,441,201 B1 | 10/2008 | Printezis |
| 7,454,708 B2 | 11/2008 | O'Neal et al. |
| 7,559,055 B2 | 7/2009 | Yang et al. |
| 7,561,178 B2 | 7/2009 | Baartman et al. |
| 7,590,945 B2 | 9/2009 | Sims et al. |
| 7,711,722 B1 | 5/2010 | Sahasi et al. |
| 7,712,052 B2 | 5/2010 | Szeliski et al. |
| 7,873,638 B2 | 1/2011 | Young et al. |
| 8,234,336 B2 | 7/2012 | Slater et al. |
| 8,392,821 B2 | 3/2013 | DeMarco et al. |
| 8,443,041 B1 | 5/2013 | Krantz et al. |
| 8,682,672 B1 | 3/2014 | Ha et al. |
| 8,682,969 B1 | 3/2014 | Sahasi et al. |
| 8,706,812 B2 | 4/2014 | Sahasi et al. |
| 8,798,252 B2 | 8/2014 | Krantz et al. |
| 9,046,995 B2 | 6/2015 | Garland |
| 9,135,312 B2 | 9/2015 | Greenspan et al. |
| 9,148,480 B2 | 9/2015 | Sahasi et al. |
| 9,224,173 B2 | 12/2015 | Arora et al. |
| 9,553,922 B1 | 1/2017 | Guarraci et al. |
| 9,720,577 B1* | 8/2017 | Sahasi .............. H04N 21/44204 |
| 9,892,028 B1 | 2/2018 | Garland |
| 9,973,576 B2 | 5/2018 | Sahasi et al. |
| 10,063,940 B1* | 8/2018 | Cox .................. G06Q 30/0625 |
| 10,430,491 B1 | 10/2019 | Joshi et al. |
| 10,785,325 B1 | 9/2020 | Baishya et al. |
| 2001/0027420 A1 | 10/2001 | Boublik et al. |
| 2001/0032242 A1 | 10/2001 | Terahama et al. |
| 2001/0032305 A1 | 10/2001 | Barry |
| 2002/0016788 A1 | 2/2002 | Burridge |
| 2002/0026323 A1 | 2/2002 | Sakaguchi et al. |
| 2002/0065635 A1 | 5/2002 | Lei et al. |
| 2002/0078150 A1 | 6/2002 | Thompson et al. |
| 2002/0085029 A1 | 7/2002 | Ghani |
| 2002/0087496 A1 | 7/2002 | Stirpe et al. |
| 2002/0107673 A1 | 8/2002 | Haller et al. |
| 2002/0112031 A1 | 8/2002 | Franklin et al. |
| 2002/0112155 A1 | 8/2002 | Martherus et al. |
| 2002/0112247 A1 | 8/2002 | Horner et al. |
| 2002/0122050 A1 | 9/2002 | Sandberg |
| 2002/0133719 A1 | 9/2002 | Westerdal |
| 2002/0143901 A1 | 10/2002 | Lupo et al. |
| 2002/0152278 A1 | 10/2002 | Pontenzone et al. |
| 2002/0193895 A1 | 12/2002 | Qian et al. |
| 2003/0004791 A1 | 1/2003 | Kojima |
| 2003/0005019 A1 | 1/2003 | Pabla et al. |
| 2003/0005465 A1 | 1/2003 | Connely |
| 2003/0014521 A1 | 1/2003 | Elson et al. |
| 2003/0025650 A1 | 2/2003 | Uesaki et al. |
| 2003/0037131 A1 | 2/2003 | Verma |
| 2003/0061280 A1 | 3/2003 | Bulson et al. |
| 2003/0061330 A1 | 3/2003 | Frisco et al. |
| 2003/0071810 A1 | 4/2003 | Shoov et al. |
| 2003/0086682 A1 | 5/2003 | Schofield et al. |
| 2003/0101091 A1 | 5/2003 | Levin et al. |
| 2003/0115267 A1 | 6/2003 | Hinton et al. |
| 2003/0154277 A1 | 8/2003 | Haddad et al. |
| 2003/0156135 A1 | 8/2003 | Lucarelli |
| 2003/0167315 A1 | 9/2003 | Chowdhry |
| 2003/0204566 A1 | 10/2003 | Dhupelia et al. |
| 2004/0024898 A1 | 2/2004 | Wan |
| 2004/0030787 A1 | 2/2004 | Jandel et al. |
| 2004/0032424 A1 | 2/2004 | Florschuetz |
| 2004/0039834 A1 | 2/2004 | Saunders et al. |
| 2004/0049539 A1 | 3/2004 | Reynolds et al. |
| 2004/0054542 A1 | 3/2004 | Foote et al. |
| 2004/0059941 A1 | 3/2004 | Hardman et al. |
| 2004/0073629 A1 | 4/2004 | Bazot et al. |
| 2004/0098754 A1 | 5/2004 | Vella et al. |
| 2004/0103150 A1 | 5/2004 | Ogdon et al. |
| 2004/0125877 A1 | 7/2004 | Chang et al. |
| 2004/0143603 A1 | 7/2004 | Kaufmann et al. |
| 2004/0148375 A1 | 7/2004 | Levett et al. |
| 2004/0153504 A1 | 8/2004 | Hutchinson et al. |
| 2004/0162787 A1 | 8/2004 | Madison et al. |
| 2004/0167896 A1 | 8/2004 | Eakin |
| 2004/0187140 A1 | 9/2004 | Aigner et al. |
| 2004/0237120 A1 | 11/2004 | Lewin et al. |
| 2004/0243928 A1 | 12/2004 | Hesmer et al. |
| 2004/0268224 A1 | 12/2004 | Balkus et al. |
| 2005/0039131 A1 | 2/2005 | Paul |
| 2005/0093860 A1 | 5/2005 | Yanagisawa et al. |
| 2005/0138560 A1 | 6/2005 | Lee et al. |
| 2005/0144258 A1 | 6/2005 | Burckart et al. |
| 2005/0183143 A1 | 8/2005 | Anderholm et al. |

(56) References Cited

U.S. PATENT DOCUMENTS

| | | |
|---|---|---|
| 2005/0204148 A1 | 9/2005 | Mayo et al. |
| 2005/0212797 A1 | 9/2005 | Lee et al. |
| 2005/0223340 A1 | 10/2005 | Repka |
| 2005/0223341 A1 | 10/2005 | Repka |
| 2005/0223342 A1 | 10/2005 | Repka et al. |
| 2005/0278650 A1 | 12/2005 | Sims et al. |
| 2005/0288001 A1 | 12/2005 | Foster et al. |
| 2006/0005114 A1 | 1/2006 | Williamson et al. |
| 2006/0031914 A1 | 2/2006 | Dakss et al. |
| 2006/0048058 A1 | 3/2006 | O'Neal et al. |
| 2006/0106780 A1 | 5/2006 | Degan |
| 2006/0129933 A1 | 6/2006 | Land et al. |
| 2006/0150149 A1 | 7/2006 | Chandhoke et al. |
| 2006/0167896 A1 | 7/2006 | Kapur et al. |
| 2006/0235973 A1 | 10/2006 | McBride et al. |
| 2006/0265495 A1 | 11/2006 | Butler et al. |
| 2006/0277553 A1 | 12/2006 | Henning et al. |
| 2007/0038931 A1 | 2/2007 | Allaire et al. |
| 2007/0055401 A1 | 3/2007 | Van Bael et al. |
| 2007/0121850 A1 | 5/2007 | Klos et al. |
| 2007/0174905 A1 | 7/2007 | Martherus et al. |
| 2007/0192613 A1 | 8/2007 | Amoroso et al. |
| 2007/0192727 A1 | 8/2007 | Finley et al. |
| 2007/0211065 A1 | 9/2007 | Feth et al. |
| 2007/0245243 A1 | 10/2007 | Lanza et al. |
| 2007/0271367 A1 | 11/2007 | Yardeni et al. |
| 2007/0282858 A1 | 12/2007 | Arner et al. |
| 2008/0005240 A1 | 1/2008 | Knighton et al. |
| 2008/0005247 A9 | 1/2008 | Khoo |
| 2008/0028341 A1 | 1/2008 | Szeliski et al. |
| 2008/0062969 A1 | 3/2008 | Picard et al. |
| 2008/0062970 A1 | 3/2008 | Picard et al. |
| 2008/0086456 A1 | 4/2008 | Rasanen et al. |
| 2008/0109396 A1 | 5/2008 | Kacin |
| 2008/0120336 A1 | 5/2008 | Bergman et al. |
| 2008/0189162 A1 | 8/2008 | Ganong et al. |
| 2008/0201736 A1 | 8/2008 | Gordon et al. |
| 2008/0235189 A1 | 9/2008 | Rayman et al. |
| 2008/0270151 A1 | 10/2008 | Mahoney et al. |
| 2008/0276271 A1 | 11/2008 | Anderson et al. |
| 2009/0013244 A1 | 1/2009 | Cudich |
| 2009/0019367 A1 | 1/2009 | Cavagnari et al. |
| 2009/0044138 A1 | 2/2009 | Rudolph et al. |
| 2009/0049385 A1 | 2/2009 | Blinnikka et al. |
| 2009/0066366 A1 | 3/2009 | Solomon |
| 2009/0083641 A1 | 3/2009 | Christy |
| 2009/0094520 A1 | 4/2009 | Kulas |
| 2009/0094544 A1 | 4/2009 | Savage |
| 2009/0100372 A1 | 4/2009 | Lauridsen |
| 2009/0133048 A1 | 5/2009 | Gibbs et al. |
| 2009/0138508 A1 | 5/2009 | Tolle |
| 2009/0171968 A1 | 7/2009 | Kane et al. |
| 2009/0172021 A1 | 7/2009 | Kane et al. |
| 2009/0172597 A1 | 7/2009 | Mercer |
| 2009/0187825 A1 | 7/2009 | Sandquist et al. |
| 2009/0217187 A1 | 8/2009 | Kendall et al. |
| 2009/0222842 A1 | 9/2009 | Narayanan et al. |
| 2009/0259937 A1 | 10/2009 | Rohall et al. |
| 2009/0287790 A1 | 11/2009 | Upton et al. |
| 2009/0292584 A1 | 11/2009 | Dalal et al. |
| 2009/0292768 A1 | 11/2009 | Franke |
| 2010/0023849 A1 | 1/2010 | Hakim et al. |
| 2010/0037205 A1 | 2/2010 | Maillot et al. |
| 2010/0057415 A1 | 3/2010 | Chu et al. |
| 2010/0189131 A1 | 7/2010 | Branam et al. |
| 2010/0192132 A1 | 7/2010 | Yuan |
| 2010/0216443 A1 | 8/2010 | Jacobstein et al. |
| 2010/0251174 A1 | 9/2010 | Belandrino et al. |
| 2010/0277696 A1 | 11/2010 | Huebner |
| 2010/0325674 A1 | 12/2010 | Liu |
| 2011/0010307 A1 | 1/2011 | Bates et al. |
| 2011/0026898 A1 | 2/2011 | Lussier et al. |
| 2011/0035431 A1 | 2/2011 | Geary et al. |
| 2011/0055176 A1 | 3/2011 | Choi et al. |
| 2011/0082719 A1 | 4/2011 | Dutta |
| 2011/0191316 A1 | 8/2011 | Lai et al. |
| 2011/0225015 A1 | 9/2011 | Spivack et al. |
| 2011/0252094 A1 | 10/2011 | Sahasi et al. |
| 2011/0276372 A1 | 11/2011 | Spivack et al. |
| 2011/0289422 A1 | 11/2011 | Spivack et al. |
| 2012/0048298 A1 | 3/2012 | Humphrey et al. |
| 2012/0084292 A1 | 4/2012 | Liang et al. |
| 2012/0109966 A1 | 5/2012 | Liang et al. |
| 2012/0130771 A1* | 5/2012 | Kannan ............ G06Q 10/06393 705/7.32 |
| 2012/0158902 A1 | 6/2012 | Udtke et al. |
| 2012/0191716 A1 | 7/2012 | Omoigui |
| 2012/0210247 A1 | 8/2012 | Khouri et al. |
| 2012/0226984 A1 | 9/2012 | Bastide et al. |
| 2012/0246137 A1 | 9/2012 | Sallakonda et al. |
| 2012/0254454 A1 | 10/2012 | Margush et al. |
| 2012/0290399 A1 | 11/2012 | England et al. |
| 2012/0290950 A1 | 11/2012 | Rapaport et al. |
| 2012/0310750 A1 | 12/2012 | Schutzbank et al. |
| 2013/0036191 A1 | 2/2013 | Fink et al. |
| 2013/0132374 A1 | 5/2013 | Olstad et al. |
| 2013/0138585 A1 | 5/2013 | Forte |
| 2013/0215116 A1 | 8/2013 | Siddique et al. |
| 2013/0268872 A1 | 10/2013 | Yin et al. |
| 2013/0282611 A1 | 10/2013 | Avedissian et al. |
| 2014/0068779 A1 | 3/2014 | Tan et al. |
| 2014/0115466 A1 | 4/2014 | Barak et al. |
| 2014/0123014 A1 | 5/2014 | Keen |
| 2014/0126714 A1 | 5/2014 | Sayko et al. |
| 2014/0126715 A1 | 5/2014 | Lum et al. |
| 2014/0136528 A1 | 5/2014 | Anima et al. |
| 2014/0214691 A1 | 7/2014 | Morris, III |
| 2014/0229839 A1 | 8/2014 | Lynch et al. |
| 2014/0237381 A1 | 8/2014 | Socolof |
| 2014/0279049 A1 | 9/2014 | Wiseman |
| 2014/0289326 A1 | 9/2014 | McCormack et al. |
| 2014/0366098 A1 | 12/2014 | Savage et al. |
| 2014/0372468 A1 | 12/2014 | Collins et al. |
| 2015/0002619 A1 | 1/2015 | Johnston et al. |
| 2015/0006610 A1 | 1/2015 | Johnston et al. |
| 2015/0082021 A1 | 3/2015 | Mandyann et al. |
| 2015/0213145 A1 | 7/2015 | Baldwin |
| 2015/0213361 A1* | 7/2015 | Gamon ................ G06N 20/00 706/12 |
| 2015/0278363 A1 | 10/2015 | Briere et al. |
| 2015/0304367 A1 | 10/2015 | Chan et al. |
| 2015/0365244 A1 | 12/2015 | Schmiltz et al. |
| 2016/0011729 A1 | 1/2016 | Flores et al. |
| 2016/0028790 A1 | 1/2016 | Eriksson et al. |
| 2016/0180248 A1 | 6/2016 | Regan |
| 2017/0046374 A1 | 2/2017 | Fletcher et al. |
| 2017/0064358 A1* | 3/2017 | Sullivan .......... H04N 21/44204 |
| 2017/0140398 A1* | 5/2017 | Fleischman ........ G06Q 30/0201 |
| 2017/0243255 A1 | 8/2017 | Sahasi et al. |
| 2017/0255696 A1* | 9/2017 | Pulitzer ................. G06Q 10/02 |
| 2018/0033051 A1 | 2/2018 | Maynard et al. |
| 2018/0211285 A1 | 7/2018 | Todasco et al. |
| 2018/0262561 A1 | 9/2018 | Sahasi et al. |
| 2018/0293610 A1 | 10/2018 | Maynard |
| 2019/0108234 A1 | 4/2019 | Torres et al. |
| 2020/0382583 A1 | 12/2020 | Sahasi et al. |

FOREIGN PATENT DOCUMENTS

| | | |
|---|---|---|
| EP | 2261898 A1 | 12/2010 |
| KR | 20100003117 A | 1/2010 |
| WO | WO 02082815 | 10/2002 |
| WO | WO 02093352 | 11/2002 |
| WO | WO 02097616 | 12/2002 |
| WO | WO2009020770 A1 | 2/2009 |

OTHER PUBLICATIONS

Navarathna, Rajitha, et al. "Estimating audience engagement to predict movie ratings." IEEE Transactions on Affective Computing 10.1 (Jul. 3, 2017): 48-59. (Year: 2017).*

(56) References Cited

OTHER PUBLICATIONS

Microsoft Corporation—"COM: Component Object Model Technologies"—archived dated Oct. 23, 2004, 2 pages, located @ http://web.archive.org/web/20041023025124/http://www.microsoft.com/com/default.mspx.
"Breeze Manager User Guide," Copyright © 2005 Macromedia, Inc., Second Edition: Jun. 2005, 306 pages.
"Breeze Meeting User Guide for Meeting Hosts and Presenters", Copyright © 2005 Macromedia, Inc., Third Edition: Sep. 2005, 130 pages.
Freeman et al.,"Creative Collaboration between Audiences and Musicians in Flock," Georgia Tech Center for Music Technology, Feb. 2010, 17 pages. http://distributedmusic.gatech.edu/jason/publications/pdf_files_of_publications/flock-digitalcreativity.pdf.
Suduc et al., "Exploring Multimedia Web Conferencing," Valahia University of Targoviste, Exploring Multimedia Web Conferencing (Year: 2009), Mar. 2009, 14 pages. https://www.researchgate.net/profile/Suduc_Ana-Maria/publication/26849386.
Abla, G. et al, "Advanced Tools for enhancing control room collaborations"—Fusion Engineering and Design, vol. 81, Issues 15-17, 5th IAEA TM on Control, Data Acquisition, and Remote Participation for Fusion Research—5th IAEA TM, Jul. 2006, pp. 2039-2044, ISSN 0920-3796, DOI: 10.1016/j.jusengdes.200.
Guthery, S., Kehr, R., and Posegga, J. 2001, How to turn a GSM SIM into a web server, In Proceedings of the Fourth Working Conference on Smart Card Research and Advanced Applications on Smart Card Research and Advanced Applications (Bristol, United Kingdom). J. Domingo-Ferrer, D. Chan, and A. Watson, Norwell, MA.
Holmberg, et al., "Web Real-Time Communication Use Cases and Requirements"; dated Mar. 2015 (29 pgs.).
Draft—C. Holmberg, et al., "Web Real-Time Communication Use Cases and Requirements"; dated Oct. 14, 2013 (25 pgs.).
Saint-Andre, P. 2005. Streaming XML with Jabber/XMPP. IEEE Internet Computing 9, 5 (Sep. 2005).
Sen, Sandip, An Automated Distributed Meeting Scheduler,PSU, Apr. 2007; http://citeseerx.ist.psu.edu/viewdoc/summary?doi=10.1.1.56.6862 (13 pgs.).
Sinha, et al., Video Conferencing System, Columbia University, http://www.cs.columbia.edu/~sedwards/classes/2009/4840/reports/RVD-presentation.pdf (11 pgs.).
Best practices in Webcasting for Publishing; Author: ON24, Publication: 2006.
NPL#1, UoW-EauClaire Microsoft PowerPoint 2003, Sep. 2004, http://web.archive.org/web/20040919191008/http://www.uwec.edu/help/ppoint03.htm, archived: Sep. 19, 2004, printed: Jan. 10, 2008.
NPL#1a, UoW-EauClaire Microsoft PowerPoint 2003, Dec. 2004, http://web.archive.org/web/20041221201404/www.uwec.edu/help/PPoint03/webenvir.htm, archived: Dec. 21, 2004, printed: Jan. 10, 2008.
3D Object Modeling and Recognition Using Local Affine-Invariant Image Descriptors and Multi-View Spatial Constraints—Fred Rothganger and Svetlana Lazebnik; Jean Ponce—Department of Computer Science and Beckman Institute, University of Illinois—Cordelia Schmid Inria, France—International Journal of Computer Vision 66(3), 231-259, 2006.
Efficient 3D shape matching and retrieval using a concrete radialized spherical projection representation—Panagiotis Papadakis, loannis Pratikakis, Stavros Perantonis, Theoharis Theoharis—Greece—Pattern Recognition 40 (2007)—ScienceDirect.
Marni Gunther, "Webcasting 101: Online Broadcasting in the Meetings and Events Industry", Netbriefings, Inc., Jul. 2008, 2 pages. http://www.netbriefings.com/pdf/0807-MtgsMNHospitality.pdf.
Ebner, et al.; "First steps towards an integration of a Personal Learning Environment at university level", Jan. 1, 2011, 15 pages.
Berthold et al.; "Psycho-pedagogical Mash-Up Design for Personalizing the Learning Environment", Knowledge Management Institute, Graz University of Technology, Austria, Jul. 11, 2011, 15 pages.
Sam Dutton, "Get Started with WebRTC", published Jul. 23, 2012 (updated: Nov. 24, 2020), 24 pages. https://www.html5rocks.com/en/tutorials/webrtc/basics/.
LeCun et al., "Deep learning", Nature, vol. 521, May 28, 2015, 10 pages. Doi: 10.1038/nature14539.
1.10. Decision Trees, 2007-2020, scikit-learn developers (BSD License), 9 pages.

\* cited by examiner

ATTENDEE ENGAGEMENT DETERMINING SYSTEM AND METHOD

FIELD

The disclosure relates to live web-based content presentations that are intended to promote a product or an idea to a specific audience and in particular to a system and method for determining audience engagement in the live web-based content presentations.

BACKGROUND

In most live web-based content presentations, a presenter invites possible customers/leads (collectively, the "attendees") to watch online content. The presenter would like to have more information about the attendees prior to the broadcast so the presenter can devote more attention to attendees that are going to be more engaged with the content. The presenter also can track if the content is going to have a good audience or if he needs to improve the promotion. The problem is how to predict the engagement level of the registrants/attendees before the broadcast.

Engagement prediction for media content is a widely researched topic. However, there are thousands of alleged solutions of this problem. One of the most popular approaches gathers information about the amount of clicks and the time spent in the page of each attendee and uses that information to predict if the user is going to be engaged with a certain topic or topics. However, a lot of the online events offer registration by a third-party which means some attendees will visit the web page only the day of the broadcast. Therefore, this approach is not ideal for the problem in hand.

Another approach is based on social network trends. In this approach, a system monitors social network interactions and topics to predict if certain content is going to attract more attention. This approach however does not work well for sharing online content that requires previous registration since a user that registered several months before the broadcast is unlikely to provide useful input to this approach. Furthermore, a big portion of the web content is private and cannot be shared publicly because it is exclusively of professional interest. Therefore this solution is not applicable for all the online contents in this context.

Thus, there is still a technical problem of being able to determine attendees engagement with content for live web-based content presentations and it is to this end that the disclosure is directed.

DETAILED DESCRIPTION OF ONE OR MORE EMBODIMENTS

The disclosure is particularly applicable to an engagement determination system and method integrated into a web-based live presentation system and it is in this context that the disclosure will be described. It will be appreciated, however, that the system and method has greater utility since it may be used with or integrated into other content systems in which it is advantageous to be able to determine attendee engagement before the presentation and the system and method may be a stand-alone system that determines the attendee engagement for a plurality of third party content systems.

Figure 1:
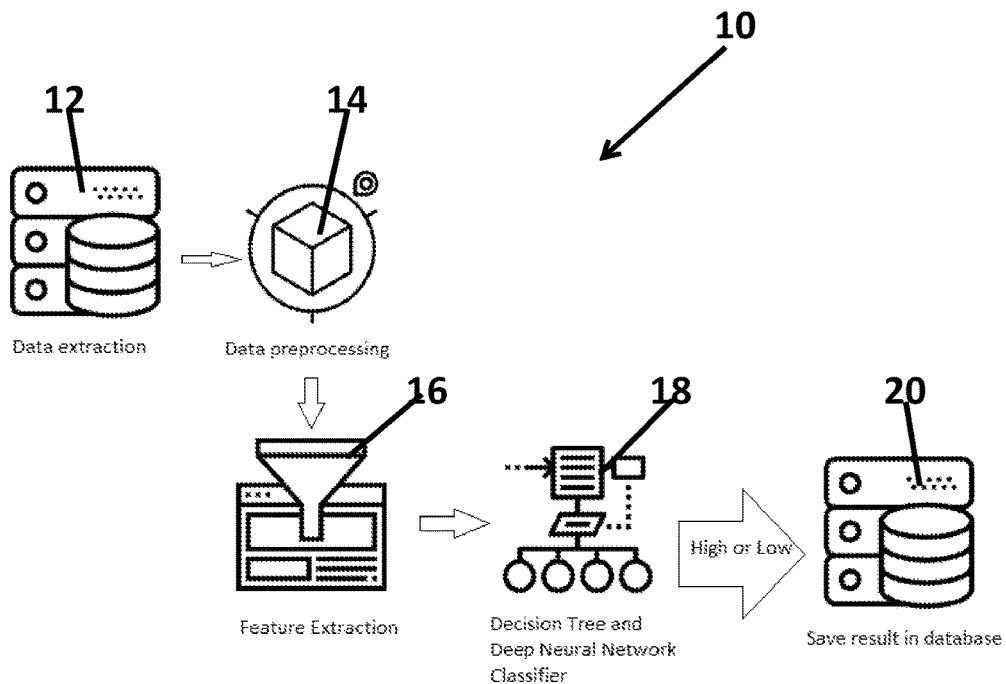
FIG. 1 illustrates a high level overview of an engagement prediction method.

FIG. 1 illustrates a high level overview of an engagement prediction method 10. The method may be carried out by various systems, both hardware or software, such as the system shown in FIG. 3. The method may also be carried out by a specialized system, such as web-based live presentation system. The method 10 may include the ordered combination of processes including data extraction 12, data preprocessing 14, feature extraction 16, classification 18 (using decision tree and deep neural networks in one embodiment) and saving of the results 20 in a storage, such as a database 38 shown in FIG. 3. The classification process may also be known as a process for generating a model for the prediction of the engagement of the attendees as described below in more detail. In the method, the information that may be used an input to the engagement prediction may include:

Engagement level from each or all registrants/attendees in the past.

Engagement source, for example if the attendee watched the online event live or on demand.

Nature of the online events watched in the past by industry and sector.

Type of online content watched in the past.

Registration method of each or all attendees.

Date and time when each registrant/attendee signed up.

Broadcast date of the live presentation for which engagement is going to be predicted.

After all the information above may be gathered (data extraction process 12) and processed (process 14) and transformed into features (process 16) to feed the model (the classification process 18). A feature vector is calculated for each attendee. The model may consist of a Decision Tree classifier and Deep Neural Network combined in a voting scheme in one embodiment. After training the classifier, it determines if the attendee is going to have a HIGH or LOW engagement level which may be saved in the storage during the storing process 20.

In this disclosure, engagement refers to a measurement of time the event is viewed, polls answered, downloaded resources and the maximum value possible is 10 and the minimum is 0. For example, if the user did not see all the video, the engagement would be Low—less than 2.0, if he completed all the questions, saw all the video and downloaded all the resources then his score will be High—greater than 4.5.

The engagement prediction may be used before and during the presentation/event. For example, during the presentation/event the engagement prediction may be used to:

Get different, more detailed communications before and during the event

Get different (higher) prioritization of their questions

Figure 2:
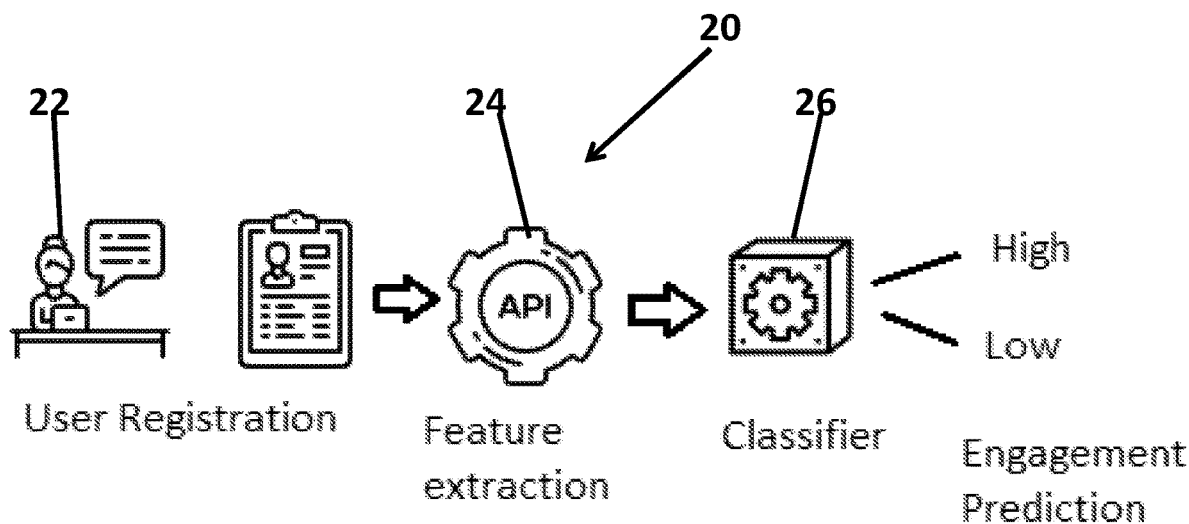
FIG. 2 illustrates a high level implementation of the engagement prediction method.

Have different chat rooms and other mechanisms available to communicate with the presenters, or with other highly engaged users FIG. 2 illustrates a high level implementation of the engagement prediction method 20. The method may be carried out by various systems, both hardware or software, such as the system shown in FIG. 3. The method may also be carried out by a specialized system, such as web-based live presentation system. A real implementation of the method may consists of three ordered stages including user registration in the web page 22, a feature extraction via API 24 and a classification 26 resulting in a high or low engagement level determination for each attendee that is determined before the live presentation has occurred.

These methods address a technical problem of being able to assess attendee engagement for a presentation before the presentation has occurred. Thus, existing systems that measure engagement after the presentation has occurred or that measure that engagement via human beings cannot achieve the solution of the disclosed system and method. Furthermore, the system and method provide a technical solution to the problem using technical features (including the data preprocessing, the feature extraction and the classification in combination) to achieve the high or low engagement prediction for each attendee before the presentation occurs. The disclosed system and method is also not just generic computers, but are specially configured and programmed systems that achieve the technical solution. The disclosed system and method also has a set of models, like a set of rules to perform facial animation, that are executed by a computer system that provide that technical solution.

Figure 3:
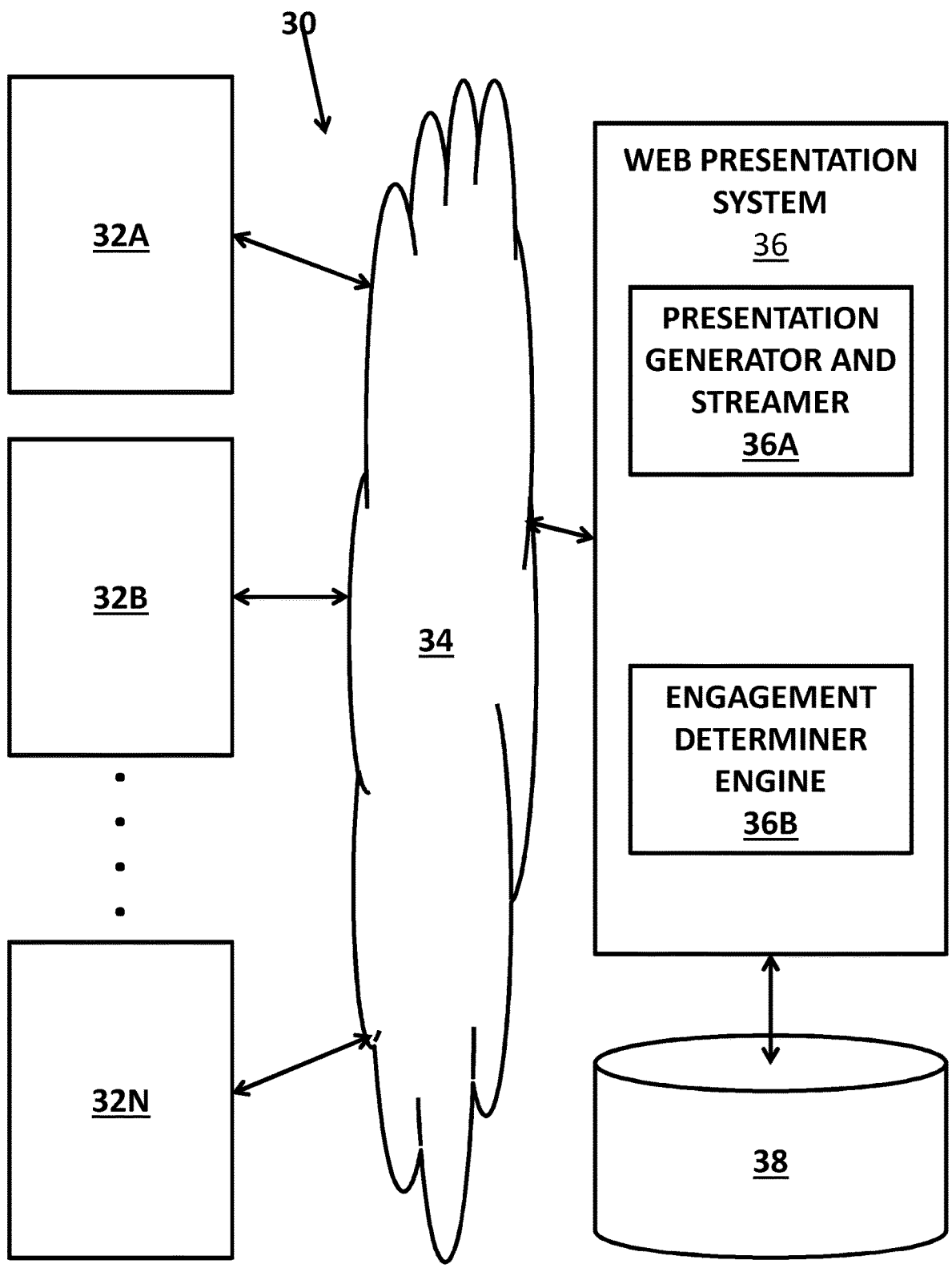
FIG. 3 illustrates an example of an implementation of a live, web-based presentation system that may incorporate an engagement prediction system that may perform the engagement prediction method.

FIG. 3 illustrates an example of an implementation of a live, web-based presentation system 30 that may incorporate an engagement prediction system that may perform the engagement prediction method. The system 30 may have frontend of the system 32, such as one or more computing devices 32A, 32B, . . . , 32N in the example in FIG. 1, that may connect over a communication path 34 to a backend 36 of a web presentation system. The frontend of the system may be used by various users of the system including a registrant/attendee of a presentation of the system and a presenter/client of the system. Each computing device of the frontend of the system may allow an entity, such as a user, company, etc., to connect to and interact with the backend 36, such as to register for a presentation, to submit a presentation or control a presentation, to submit a request for the predicted engagement of the attendees or to review/view/display the predicted engagement of the attendees for a particular future live presentation. Each computing device 32A, 32B or 32N may be a processor based device with one or more processors, memory, persistent storage, a display, input/output devices such as keyboards or printers, etc. and connectivity circuits that allow the user, using the computing device, to connect to the backend and then interact with the backend 36. For example, each computing device may be a personal computer, a smartphone or mobile device, a terminal device, a laptop computer, a tablet computer, etc. In an embodiment in which HTTPS/HTTP and HTML are used for protocols, each computing device may have a browser application or other application that receives data from the backend and generates a display of that data, such as a webpage and also allows the user to enter data into a form/webpage and send the data to the backend system 36.

The communication path 34 may be a wired path, a wireless path or a combination of the wired and wireless paths. Each piece of the path may be a wired network like Ethernet, a wireless computer network, a wired computer network, a wireless digital data network, a cellular digital data network, a WiFi network and the like. The communication path 34 may use various communication and data transfer protocols. For example, in one embodiment, the communications path may use TCP/IP and HTTP or HTTPS data transfer protocols and the HTML data protocols.

The backend 36 may be implemented using one or more computing resources, such as cloud computing or Amazon Web Services® (AWS®) resources or server computers. The computing resources used to implement the backend 36 are specifically configured such that, although the computing resources alone are generic computer elements, the combination of the computing resources and the software/hardware described below results in specialized hardware/software that performs the processes of the system as described below.

The backend 36 may include a presentation generator and streamer element 36A and an engagement determiner engine 36B. The presentation generator and streamer element 36A may be used to help a presenter to generate each presentation, store the presentation, allow the user to control the presentation and delivery the presentation to each attendee and gather data about each attendee for each presentation. The engagement determiner engine 36B is used to gather engagement data, generate a classifier model and then use classification to determine an engagement (high or low in one example) of each attendee of a particular presentation before the presentation has occurred as described below in more detail. In the example in FIG. 3, the engagement determiner engine 36B is incorporated into the online, web presentation system 36 as shown. However, the engagement determiner engine 36B may also be a standalone system or a software as a service system that provides its attendee engagement determination to a plurality of third party presentation systems that can provide the requisite data in order to perform the determination of the attendee engagement.

Each of the presentation generator and streamer element 36A and the engagement determiner engine 36B may be implemented in hardware or software or a combination of hardware and software. When each of the presentation generator and streamer element 36A and the engagement determiner engine 36B is implemented in hardware, each of the elements may be a specialized hardware device, such as a field programmable gate array, microcontroller, etc. that may be configured to perform the processes of the presentation generator and streamer element 36A or the engagement determiner engine 36B so that each of these elements is implemented using a specialized piece of hardware. When each of the presentation generator and streamer element 36A and the engagement determiner engine 36B is implemented in software, each of the elements may be a plurality of lines of computer code/instructions that may be executed by a processor of a computing resource of the backend 36 so that the processor is configured to perform the processes of the presentation generator and streamer element 36A or the engagement determiner engine 36B so that each of these elements is implemented using a computing resource with a plurality of lines of computer and it is the plurality of lines of code and the processes implemented that provide the technical solution. When each of the presentation generator and streamer element 36A and the engagement determiner engine 36B is implemented in hardware and software, each element may be a combination of the above described elements that again is a specialized computer system that implements the processes and provides the technical solutions. In the software implementation, the engagement determiner engine 36B may use Python code for the classifier and the database engine for the feature extraction and Java for the services.

Figure 4:
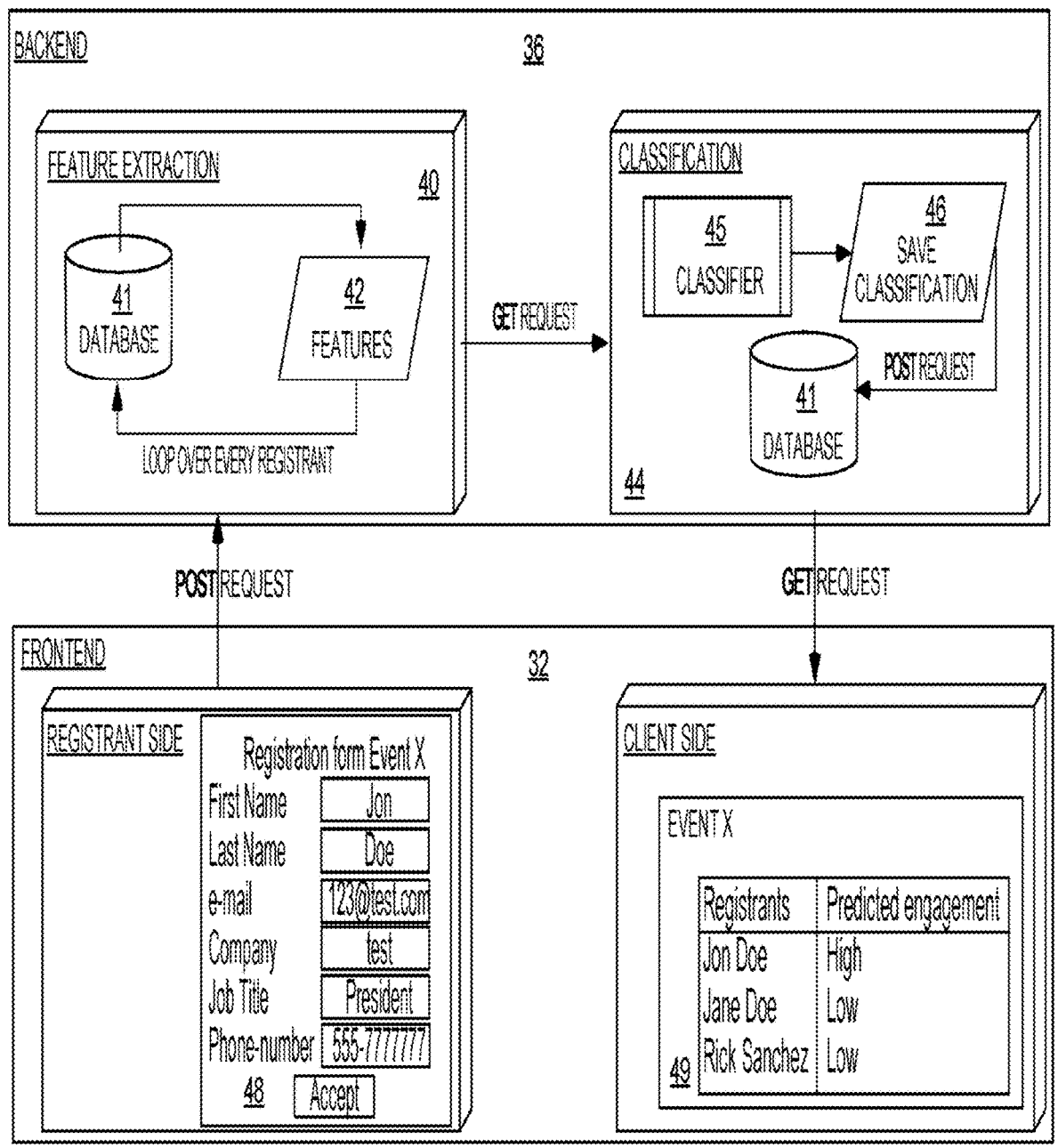
FIG. 4 illustrates more details of the front end and backend of the engagement prediction system.

FIG. 4 illustrates more details of the front end 32 and backend 36 of the engagement prediction system. The front end 32 may further include a registrant element 48 and a client element 49 wherein each of these elements may be implemented using the computing devices as described above that allow a user (the soon to be attendee/registrant for the registrant element and the presenter for a presentation for the client element) to connect to and interact with the backend 36. For example, each of the elements 48, 49 may be a user interface displayed on the computing device that permits the user to interact with the backend 36. For example, the registrant element 48 may be a registration form that is displayed to the registrant and permits the registrant to enter information into a form, such as a web form in one embodiment, to register for a particular presentation. Thus, each registrant for a presentation may be presented with the registrant element user interface 49, an example of which is shown in FIG. 4. As shown in FIG. 4, a POST request communicates the information filled in by each registrant to the backend 36.

The client element 49 may be a user interface as well that may be displayed to a presenter of a particular presentation. The user interface may be generated for each presentation, such as the event X presentation in the example in FIG. 4. The user interface may list each attendee/registrant of a future particular presentation and a predicted engagement (high or low is the example in FIG. 4) for each attendee/registrant that may be generated based on the output of the engagement determiner engine 36B. In one implementation, the data used to generate the user interface may be retrieved from the backend 36 using a GET request.

The backend 36 may further comprise a feature extraction element 40 and a classification element 44. These two elements cooperate to perform the engagement prediction process and generating an engagement prediction for each attendee of a future presentation. Each of the feature extraction element 40 and a classification element 44 may be implemented in software or hardware as described above and may together be a specialized piece of hardware or software that provides the technical solution of the predicted engagement of each attendee for a future particular presentation.

The feature extraction element 40 may include a database 41 and a feature extractor 42. The feature extraction element 40 may receive the registrant/attendee registration data from each registrant/attendee through the POST request and all of that data may be stored in the database 41. The feature extractor 42 may be an algorithm/process that performs feature extraction based on part on the registrant's data and the feature extractor 42 may loop over every registrant to extract the features. The features extracted during this process may be communicated, in one embodiment, using a GET request, to the classification process 44.

Figure 5:
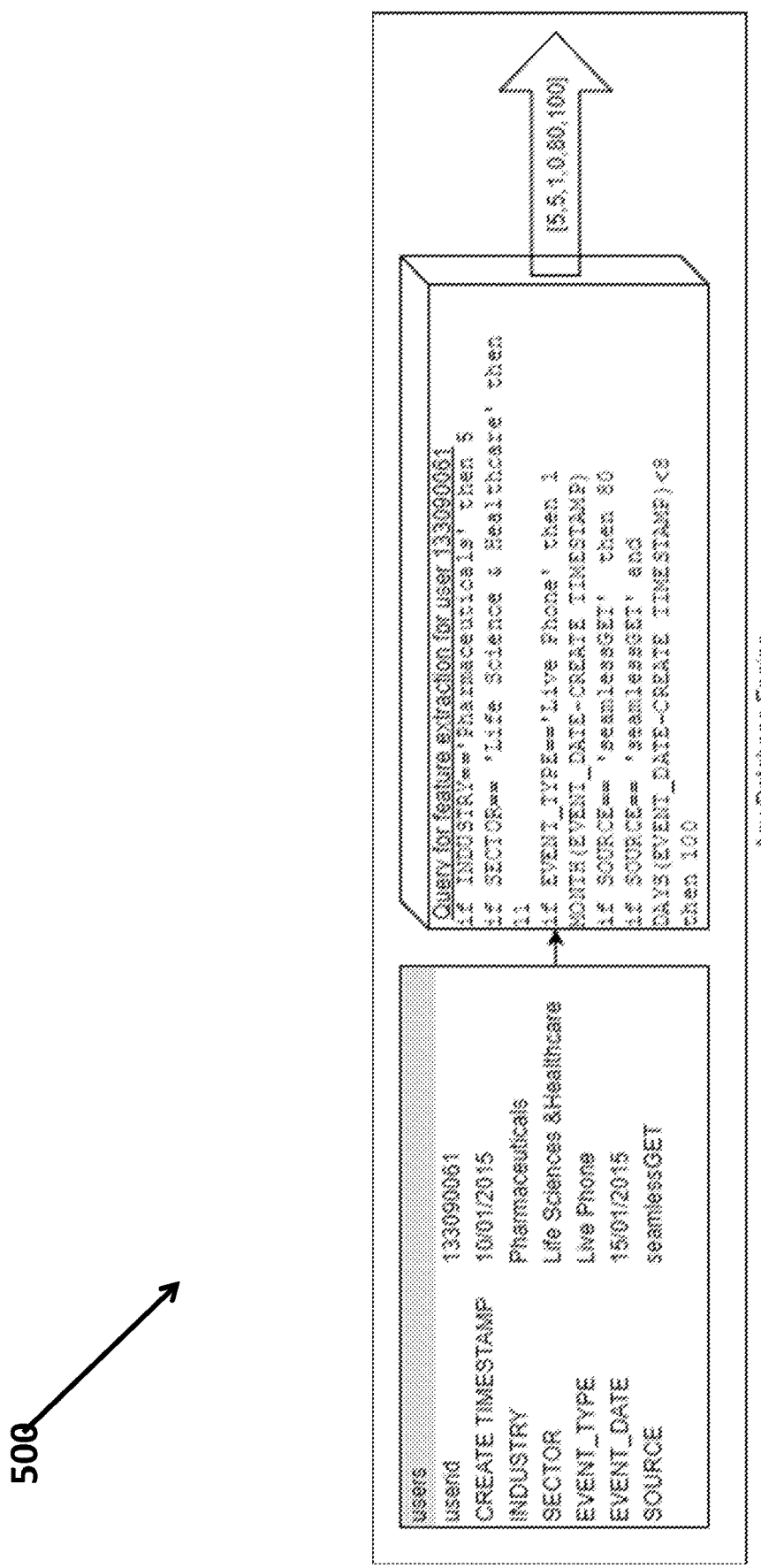
FIG. 5 illustrates more details of the feature extraction process.

FIG. 5 illustrates more details of the feature extraction process 500. In the feature extraction process, the feature extractor 42 may use the registrant/attendee registration data to extract the features for determining the engagement. For example, the type of data for each attendee/registrant as shown in FIG. 5 may include:
[USER ID, CREATE TIMESTAMP, SOURCE, EVENT DATE, INDUSTRY, SECTOR, EVENT TYPE, ENGAGEMENT SCORE]

Given the above data types, an example of the data from a particular attendee/registrant may be:
[133090061, 11/01/16, "seamlessGET", 02/09/10, "Medical Devices", "Life Sciences & Healthcare", "Live Phone", 4.6] of the examples of the data as shown in FIG. 5.

The feature extraction process, using the above features, may extract those features from each attendee/registrant information. In one embodiment, the feature extraction may be done using a set of if/then rules (executed by a database engine) that determine a score, such as a numerical score for each feature. An example of the set of rules for the feature extraction are shown in FIG. 5. The result of the feature extraction process is a feature vector for the particular attendee/registrant such as [5, 5, 1, 0, 80, 100] as shown in FIG. 5. The feature vector may be used by the classification process to generate the engagement determination for the particular attendee. For example, if a user registered 4.4 months after the event, the registration was done by himself and because of the delayed registration, the probability of High engagement is reduced. The event was intended to be enjoyed live, this user is going to watch it on-demand that reduces the chances of better engagement. In another example, a user that registered less than less than a month before the event and the registration was done by himself, those factors increment the probability of High engagement. The event is type Live Phone that also increments the probability of High Engagement.

Returning to FIG. 4, the classification element 44 may further include a classifier process 45, a save process 46 and the database 41. The classifier 45 may generate a model from the various extracted features and then perform a classifier process for each registrant/attendee of the future presentation to determine an engagement for each attendee/registrant. The save process 46 may save the classification results and the classifier model and the engagement prediction results for each attendee/registrant to the database 41. In one embodiment, the results and data may be saved to the database using a POST request. When the client element 49 of the frontend 32 requests the engagement data for each attendee of a future event/presentation, that data may be retrieved from the database 41 via a GET request as shown in FIG. 4.

Figure 6:
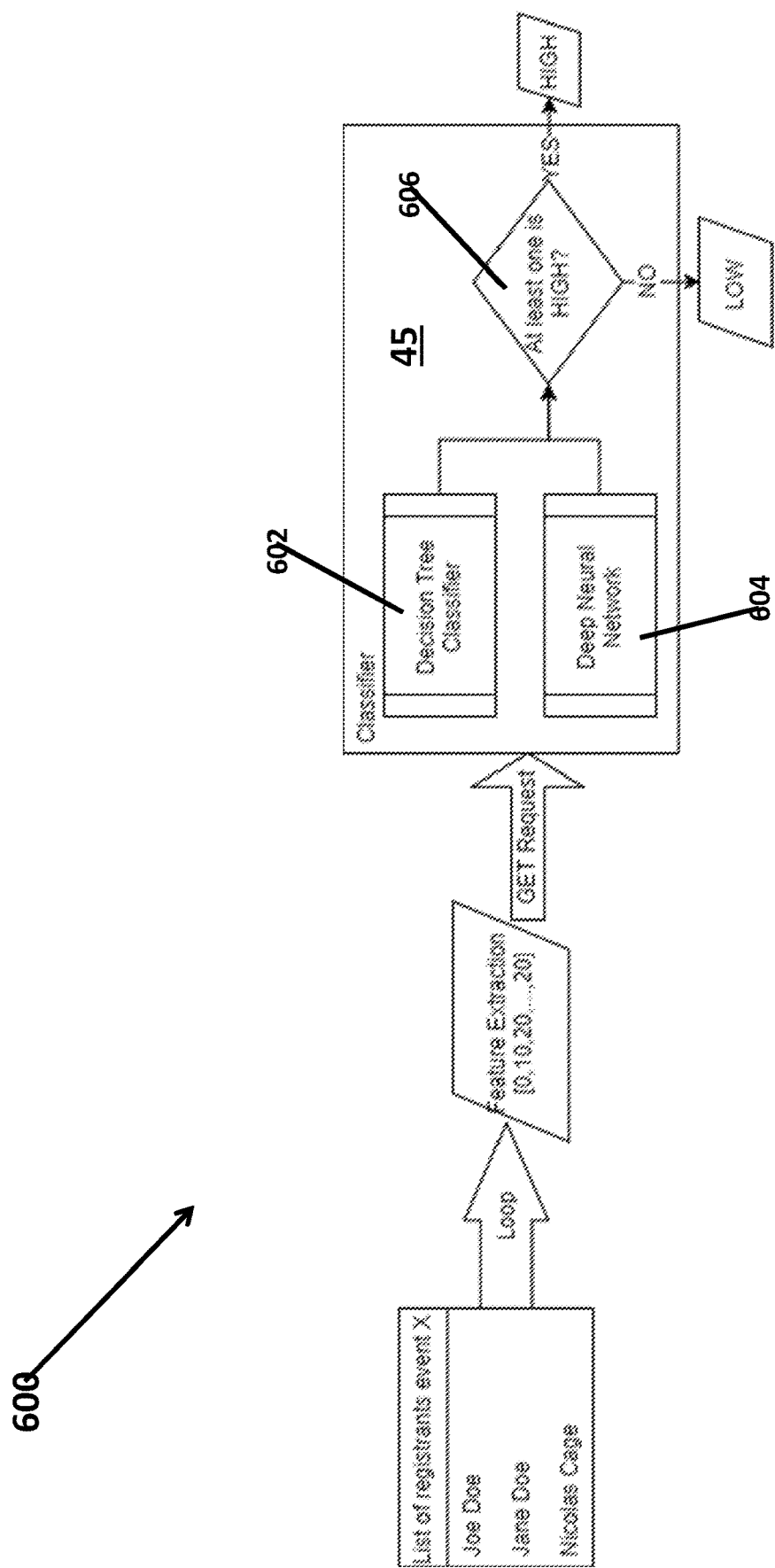
FIG. 6 illustrates more details of the classification process.

FIG. 6 illustrates more details of the classification process 600. In which a list of registrants/attendees are the particular event (Event X) are processed to generate the feature vector for each registrant/attendee that is communicated to the classifier 45, such as by a GET request in the example shown in FIG. 6. The classifier 45 may include a decision tree classifier process 602 and a deep neural network process 604 that receive each feature vector for each registrant/attendee as an input. Each of the processes 602, 604 may be trained using feature vector data that includes the various feature scores and the desired engagement output for a low engagement and a high engagement. For example, the training data may be:
[31, 10, 80, 80, 50, 2, 0, HIGH]
[ 9, 8, 10, 70, 50, 1, 4, LOW]

In one embodiment, the system may use a deep learning algorithm. The deep learning algorithm is a computational model that are composed of multiple processing layers to learn representations of data with multiple levels of abstraction. The system may use a decision tree. Decision Trees (DTs) are a non-parametric supervised learning method used for classification and regression. The goal is to create a model that predicts the value of a target variable by learning simple decision rules inferred from the data features. A tree can be seen as a piecewise constant approximation. There are various decision tree algorithms. Iterative Dichotomiser 3 (ID3) was developed in 1986 by Ross Quinlan. The algorithm creates a multiway tree, finding for each node (i.e. in a greedy manner) the categorical feature that will yield the largest information gain for categorical targets. Trees are grown to their maximum size and then a pruning step is usually applied to improve the ability of the tree to generalise to unseen data.

C4.5 is the successor to ID3 and removed the restriction that features must be categorical by dynamically defining a discrete attribute (based on numerical variables) that partitions the continuous attribute value into a discrete set of intervals. C4.5 converts the trained trees (i.e. the output of the ID3 algorithm) into sets of if-then rules. These accuracy of each rule is then evaluated to determine the order in which they should be applied. Pruning is done by removing a rule's precondition if the accuracy of the rule improves without it.

Classification and Regression Trees (CART) is very similar to C4.5, but it differs in that it supports numerical target variables (regression) and does not compute rule sets. CART constructs binary trees using the feature and threshold that yield the largest information gain at each node.

Given training vectors $X_i \in R^n$, i=1, ..., 1 and a label vector $y \in R^1$, a decision tree recursively partitions the feature space such that the samples with the same labels or similar target values are grouped together. Let the data at node m be represented by $Q_m$ with $N_m$ samples. For each candidate split $\theta=(j, t_m)$ consisting of a feature j and threshold $t_m$, partition the data into $Q_m^{left}(\theta)$ and $Q_m^{right}(\theta)$ subsets $$Q_m^{left}(\theta) = \{(x,y) | x_j <= t_m\}$$

$$Q_m^{right}(\theta) = Q_m \setminus Q_m^{left}(\theta)$$

The quality of a candidate split of node m is then computed using an impurity function or loss function HO, the choice of which depends on the task being solved (classification or regression)

$$G(Q_m, \theta) = \frac{N_m^{left}}{N_m} H(Q_m^{left}(\theta)) + \frac{N_m^{right}}{N_m} H(Q_m^{right}(\theta))$$

Select the parameters that minimises the impurity $$\theta^* = \operatorname{argmin}_\theta G(Q_m, \theta)$$

Recurse for subsets $Q_m^{left}(\theta^*)$ and $Q_m^{right}(\theta^*)$ until the maximum allowable depth is reached, $Nm < \min_{samples}$ or $N_m = 1$.

If a target is a Classification outcome taking on values 0, 1, ..., K-1, for node m, let $p_{mk} = 1/N_m \Sigma_{y \in Q_m} I(y=k)$ be the proportion of class k observations in node m.

The deep learning algorithm is described more fully at www.nature.com/nature/journal/v521/n7553/abs/nature14539.html?foxtrotcallback=true and the decision tree is described in more detail at scikit-learn.org/stable/modules/tree.html, both of which are incorporated herein by reference.

The deep learning model consists of weights of units that conform several layers, so the final result would depend of the weights, the number of layers and activation function. For the case of the decision tree, the model consists of conditions that splits data in two groups in every branch, these branches can grow until the data cannot be split any more, this is called a leaf. So depending on the different features in the vector, we take a different path in the tree, so there is no factor for HIGH or LOW is a path of branches and leafs which takes to the final result. Both models are capable of discover deeply entangled structures in data, because there is no single feature that classifies the data completely, is the combination of all features which gives us the answer.

For each attendee/registrant, the trained decision tree classifier performs a classification based on the feature vector and the deep neural network performs a similar process based on the feature vector. An ensemble learning technique called voting may be used. This technique is used to improve the final precision because every one of the models presents a higher error than when both are combined. The decision tree model is better to predict HIGH engagement than LOW engagement, while the deep learning model had a balanced error in both categories. When the two processes are combined, the accuracy for both categories are improved. As an example, the voting algorithm used may be: if at least one classifier predicts HIGH then the result is HIGH, if both classifiers predict LOW then the result is LOW.

The result from each of these processes is a HIGH engagement level or a LOW engagement level for the particular attendee/registrant. The process may then determine (606), as part of a voting process, if at least one of the scores from the two classifier processes is HIGH. If at least one of the scores from the two classifier processes is HIGH, then the predicted engagement of the particular attendee/registrant is HIGH. If at least one of the scores from the two classifier processes is not HIGH, then the predicted engagement of the particular attendee/registrant is LOW. Although the decision tree classifier and the deep neural network are shown in FIG. 6, the classifier process 600 may use other classifiers and/or more classifiers wherein the classifiers are suitable for categorical features and binary objective variable.

Figure 7:
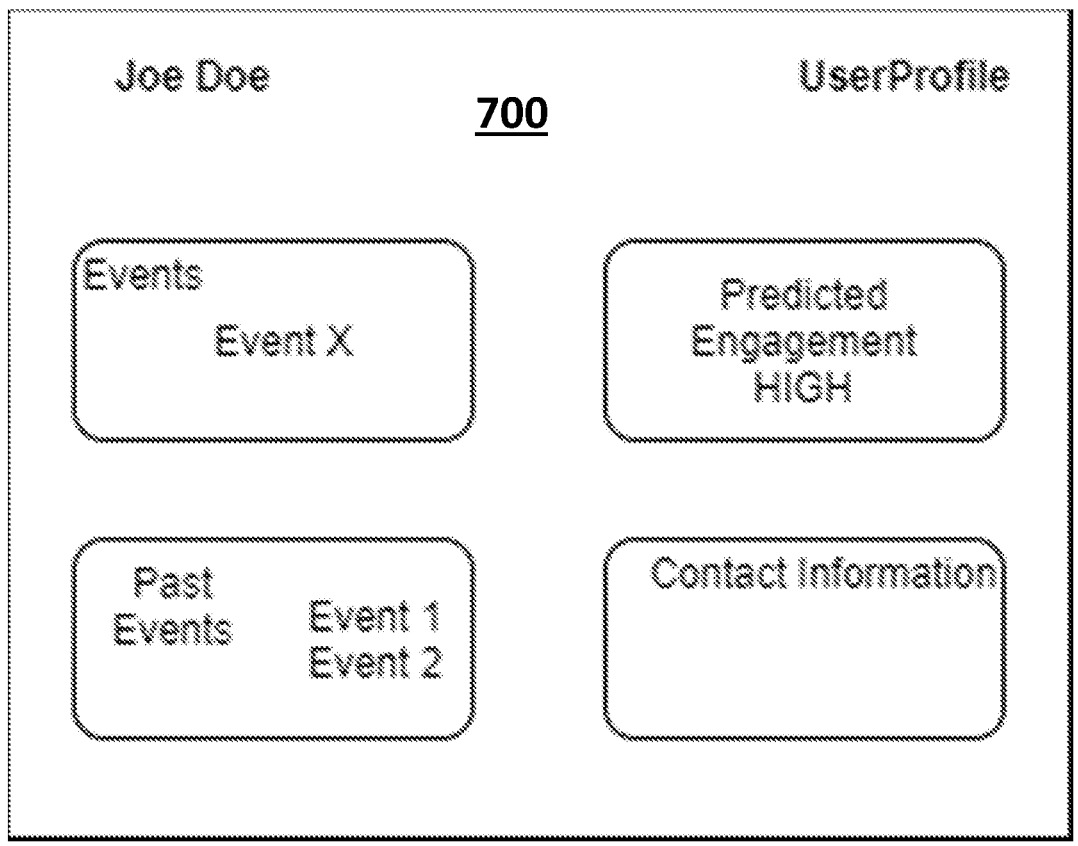
FIG. 7 illustrates an example of a user profile of an attendee/registrant that includes the engagement prediction.

FIG. 7 illustrates an example of a user profile 700 of an attendee/registrant that includes the engagement prediction wherein the engagement prediction data may be generated by the engagement predictor of the system. This user profile may display the generated engagement prediction and shows that the system and method interacts with users during the process and is thus not just a black box process without any external output. The user profile may include the future event being attended by the user (Event X in one example), the past events attended by the user (Event 1 and Event 2 in this example) that may be used to determine the user engagement for the future event and the predicted engagement for the user for the future presentation (high is this example).

In summary, the disclosed system and method uses the characteristics of the registration such as the method used, how many days prior the online event, the type of online content, among others, instead of time spent in the web page or amount of clicks, to determine an engagement level for each registrant/attendee. The context of this problem is different from other type of web content because we know that the registrant has the intention to consume the online content. We predict if he is going to watch and be present until the end, not if he is going to consume more content about the same topic, which is the usual approach.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that performs particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method for engagement determination of a future event for a particular attendee of the future event, comprising:
   retrieving a feature vector for a particular attendee, the feature vector having a score for each of a plurality of features for the particular attendee, the feature vector being generated based on past event data of the particular attendee;
   generating an engagement prediction for the particular attendee for the future event using a classifier model, a decision tree classifier and a deep neural network and the feature vector for the particular attendee, wherein generating the engagement prediction further comprises generating one of a high engagement output and a low engagement output for each of the decision tree classifier and the deep neural network and combining the outputs of the decision tree classifier and the deep neural network to determine the engagement prediction is one of a high engagement prediction output and a low engagement prediction output;
   executing a voting process to determine the engagement prediction in which the high engagement prediction output is selected if at least one output of the decision tree classifier and the deep neural network is the high engagement output and the low engagement prediction output is selected if both of the outputs of the decision tree classifier and the deep neural network are low; and
   displaying a user profile of the particular attendee, the user profile including the engagement prediction of the particular attendee for the future event.

2. The method of claim 1, wherein generating the engagement prediction further comprises generating a score of the decision tree classifier based on the feature vector, generating a score of the deep neural network based on the feature vector and determining the engagement prediction based on the scores of the decision tree classifier and the deep neural network.

3. The method of claim 1 further comprising extracting the feature vector from a database that contains a set of data about past events for the particular attendee.

4. The method of claim 3, further comprising generating a score for each feature.

5. The method of claim 3 further comprising receiving a set of registration data from the particular attendee for the future event.

6. The method of claim 5, wherein receiving the set of registration data further comprises using a user interface to receive the set of registration data.

7. The method of claim 1, wherein the future event is a live presentation.

8. A system, comprising:
   a plurality of computing devices including a plurality of attendee computing devices each having a display to register a plurality of particular attendees for a future event and a presenter computing device having a display to display an engagement level for each attendee of the future event;
   a backend computer system that receives a set of registration data from each attendee computing device when the particular attendee registers for the future event;
   the backend computer system having a processor, memory and a plurality of lines of computer code that are configured to:
   retrieve a feature vector for a particular attendee, the feature vector having a score for each of a plurality of features for the particular attendee, the feature vector being generated based on past event data of the particular attendee;
   generate an engagement prediction for the particular attendee for the future event using a classifier model, a decision tree classifier and a deep neural network and the feature vector for the particular attendee, wherein the backend is further configured to generate one of a high engagement output and a low engagement output for each of the decision tree classifier and the deep neural network, combine the outputs of the decision tree classifier and the deep neural network to determine the engagement prediction is one of a high engagement prediction output and a low engagement prediction output and execute a voting process to determine the engagement prediction in which the high engagement prediction output is selected if at least one output of the decision tree classifier and the deep neural network is the high engagement output and the low engagement prediction output is selected if both of the outputs of the decision tree classifier and the deep neural network are low; and display a user profile of the particular attendee on a display of the presenter computing device, the user profile including the engagement prediction of the particular attendee for the future event.

9. The system of claim 8, wherein the backend computer system is further configured to generate a score of the decision tree classifier based on the feature vector, generate a score of the deep neural network based on the feature vector and determine the engagement prediction based on the scores of the decision tree classifier and the deep neural network.

10. The system of claim 8, wherein the backend computer system is further configured to extract the feature vector from a database that contains a set of data about past events for the particular attendee.

11. The system of claim 10, wherein the backend computer system is further configured to generate a score for each feature.

12. The system of claim 8, wherein the backend computer system is further configured to provide a user interface to receive the set of registration data.

13. The system of claim 8, wherein the future event is a live presentation.

14. An apparatus, comprising:
a backend computer system that receives a set of registration data from each attendee computing device when a particular attendee registers for a future event, the backend computer system having a processor, memory and a plurality of lines of computer code that are configured to:
retrieve a feature vector for the particular attendee, the feature vector having a score for each of a plurality of features for the particular attendee, the feature vector being generated based on past event data of the particular attendee;
generate an engagement prediction for the particular attendee for the future event using a classifier model, a decision tree classifier and a deep neural network and the feature vector for the particular attendee, wherein the computer system is further configured to generate one of a high engagement output and a low engagement output for each of the decision tree classifier and the deep neural network, combine the outputs of the decision tree classifier and the deep neural network to determine the engagement prediction is one of a high engagement prediction output and a low engagement prediction output and execute a voting process to determine the engagement prediction in which the high engagement prediction output is selected if at least one output of the decision tree classifier and the deep neural network is the high engagement output and the low engagement prediction output is selected if both of the outputs of the decision tree classifier and the deep neural network are low; and communicate a user profile of the particular attendee to a presenter, the user profile including the engagement prediction of the particular attendee for the future event.

15. The apparatus of claim 14, wherein the backend computer system is further configured to generate a score of the decision tree classifier based on the feature vector, generate a score of the deep neural network based on the feature vector and determine the engagement prediction based on the scores of the decision tree classifier and the deep neural network.

16. The apparatus of claim 14, wherein the backend computer system is further configured to extract the feature vector from a database that contains a set of data about past events for the particular attendee.

17. The apparatus of claim 16, wherein the backend computer system is further configured to generate a score for each feature.

18. The apparatus of claim 16, wherein the backend computer system is further configured to provide a user interface to receive the set of registration data.

19. The apparatus of claim 14, wherein the future event is a live presentation.

* * * * *